United States Patent
Knijnenburg

(10) Patent No.: US 9,199,716 B2
(45) Date of Patent: Dec. 1, 2015

(54) AIRCRAFT DOOR SYSTEM HAVING A DOOR ACTUATOR AND MOVEMENT DETECTOR

(75) Inventor: Thorsten Knijnenburg, Bremen (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 13/984,916

(22) PCT Filed: Feb. 15, 2012

(86) PCT No.: PCT/EP2012/052633
§ 371 (c)(1),
(2), (4) Date: Aug. 12, 2013

(87) PCT Pub. No.: WO2012/110569
PCT Pub. Date: Aug. 23, 2012

(65) Prior Publication Data
US 2013/0318873 A1  Dec. 5, 2013

Related U.S. Application Data

(60) Provisional application No. 61/444,331, filed on Feb. 18, 2011.

(30) Foreign Application Priority Data

Feb. 18, 2011 (DE) .......... 10 2011 004 400

(51) Int. Cl.
*B64C 1/14* (2006.01)
*B64G 1/66* (2006.01)
(Continued)

(52) U.S. Cl.
CPC ............ *B64C 1/1423* (2013.01); *B64C 1/1407* (2013.01); *B64G 1/66* (2013.01);
(Continued)

(58) Field of Classification Search
CPC ...... B64C 1/1423; B64C 1/1407; B64G 1/66; E05F 15/614; E05F 15/70
USPC ......... 49/333–335, 381, 400–402; 244/158.1, 244/171.9, 129.5, 129.4
See application file for complete search history.

(56) References Cited

U.S. PATENT DOCUMENTS 5,163,639 A    11/1992  Herrmann et al.
5,168,666 A *  12/1992  Koura et al. ................... 49/360
(Continued)

FOREIGN PATENT DOCUMENTS

DE    102 07 033 B4    9/2003
DE    20 2004 015 472 U1    1/2005
DE    10 2008 030 049 A1    1/2010

OTHER PUBLICATIONS

International Search Report, Jan. 18, 2013.
(Continued)

*Primary Examiner* — Katherine Mitchell
*Assistant Examiner* — Marcus Menezes
(74) *Attorney, Agent, or Firm* — Greer Burns & Crain, Ltd.

(57) ABSTRACT

A door system for an aircraft or spacecraft having a door and an actuator for actuating the door. The actuator includes an actuator drive which moves the door in relation to the aircraft or spacecraft, a detection device which determines movement information of the door and/or of the actuator, an actuator control unit which controls the actuator based on the movement information, and an actuator housing which surrounds the actuator drive and the actuator control unit.

14 Claims, 3 Drawing Sheets

(51) Int. Cl.
*E05F 15/614* (2015.01)
*E05F 15/70* (2015.01)
*B64G 1/22* (2006.01)

(52) U.S. Cl.
CPC .............. *E05F 15/614* (2015.01); *E05F 15/70* (2015.01); *B64G 1/22* (2013.01); *E05Y 2400/326* (2013.01); *E05Y 2800/205* (2013.01); *E05Y 2800/23* (2013.01); *E05Y 2900/502* (2013.01)

(56) References Cited

U.S. PATENT DOCUMENTS

| | | | |
|---|---|---|---|
| 5,180,121 A * | 1/1993 | Banks et al. | 244/129.5 |
| 5,289,615 A * | 3/1994 | Banks et al. | 16/366 |
| 5,305,969 A * | 4/1994 | Odell et al. | 244/129.5 |
| 6,742,744 B2 * | 6/2004 | Schreitmueller et al. | 244/129.5 |
| 7,367,161 B1 * | 5/2008 | Jones | 49/334 |
| 7,578,476 B2 * | 8/2009 | Wiers et al. | 244/129.5 |
| 8,915,017 B2 * | 12/2014 | Linnenkohl | 49/334 |
| 2002/0060270 A1 * | 5/2002 | Buchs et al. | 244/129.5 |
| 2002/0104266 A1 * | 8/2002 | Ranaudo | 49/334 |
| 2002/0104926 A1 * | 8/2002 | Marquard et al. | 244/129.5 |
| 2003/0006343 A1 * | 1/2003 | Senger | 244/129.5 |
| 2003/0132347 A1 * | 7/2003 | Blum et al. | 244/129.5 |
| 2006/0202087 A1 * | 9/2006 | Mortland | 244/129.5 |
| 2007/0095985 A1 | 5/2007 | Wiers et al. | |
| 2009/0072089 A1 * | 3/2009 | Obst | 244/129.5 |

OTHER PUBLICATIONS

German Patent Office, First Examination Report in German Patent Application No. 10 2011 004 400.0, mailed May 8, 2012.

* cited by examiner

AIRCRAFT DOOR SYSTEM HAVING A DOOR ACTUATOR AND MOVEMENT DETECTOR

CROSS-REFERENCES TO RELATED APPLICATIONS

This application claims the benefit of the U.S. Provisional Application No. 61/444,331, filed on Feb. 18, 2011, and of the German patent application No. 10 2011 004 400.0 filed on Feb. 18, 2011, the entire disclosures of which are incorporated herein by way of reference.

FIELD OF THE INVENTION

The present invention relates to a door system actuated by an actuator for an aircraft or spacecraft and to an aircraft or spacecraft having at least a door system of this type.

Although it can be used in any field, the present invention will be described in greater detail in relation to an aircraft or passenger aircraft.

BACKGROUND OF THE INVENTION

In current door systems in aircraft, door systems are conventionally used which, for opening and closing the respective door of the aircraft, comprise a manual actuating device for normal use and a pneumatic actuator, for example having a gas pressure cylinder, for emergency use. The conventional manual actuating device is not easy for the operating personnel, in particular the flight attendant, to handle. In the event of strong winds or gusts, the handling of the manual actuating device is also sometimes dangerous for the operating personnel.

In addition, the pneumatic actuator specifically for emergency use involves a high level of maintenance. This high level of maintenance results for example from the necessary regular checking of the gas pressure of the gas pressure cylinder of the pneumatic actuator. Furthermore, there is the problem of leakage when a pneumatic actuator is used. This entails increased maintenance outlay and therefore increased expenditure.

Furthermore, the conventional pneumatic actuators, including the conventional manual actuating devices, are not equipped to provide a monitoring or error message in the case of a fault or disturbance. For example, if the gas pressure drops below a required minimum level, the conventional pneumatic actuators are not equipped to report a fault of this type. In this case, it is conventional to await the monitoring intervals. However, if a fault occurs at the start of an interval of this type, the door is not equipped with a ready-to-use emergency actuating system for a relatively long period of time.

The commercial aircraft Airbus A380 is fitted with electrically actuated door systems, in which electrical actuators integrated in the doors are used for conventional opening and closing of the door for normal use, for example for boarding and disembarkation of the passengers, and also for emergency opening of the door in an emergency. In order to achieve high operational reliability in an emergency, when the connections of the door to the rest of the aircraft could be damaged, emergency electricity supply devices and control devices are provided in the doors themselves, which leads to greater complexity during production and greater weight. While door systems of this type require continuous maintenance, the removal and fitting of components in the event of a fault is very expensive.

SUMMARY OF THE INVENTION

It is thus an idea of the present invention to provide a less expensive and lighter means of actuating the door of an aircraft with great ease and safety.

Another idea is to provide a means of actuating the door of an aircraft which is easy to maintain, and in particular easy to replace in the event of damage.

A door system for an aircraft or spacecraft is accordingly proposed, having a door and an actuator for actuating the door. The actuator comprises an actuator drive which moves the door in relation to the aircraft or spacecraft, a detection device which determines movement information of the door and/or of the actuator, an actuator control unit which controls the actuator based on the movement information, and an actuator housing which surrounds the actuator drive and the actuator control unit.

Movement information is understood to be information characterising a present state of movement of the door, for example a current opening angle, a pivot speed or pivot acceleration of the door or of an object coupled to the door, such as the actuator actuating the door. In addition to the actuator having the actuator control unit capable of controlling the actuator, and the detection device, the proposed door system comprises a complete control loop which, by monitoring the movement by means of the movement information, allows the movement of the door to be precisely controlled, irrespective of environmental conditions such as strong winds and gusts. It is therefore easy and safe to handle. The fact that the door system comprises said components in a common actuator housing allows the actuation of the door without a separate control unit, which not only means a lower constructional weight, smaller overall size, and lower production costs, but also allows greater reliability.

The proposed door system is thus adapted for conventional opening and closing of the door for normal use, for example for boarding and disembarkation of the passengers, and in principle also for emergency opening of the door in an emergency. In addition to a conventional manual actuating device of the door, the door system can thus also replace the conventional pneumatic actuator, for example with a gas pressure cylinder, or it can be used in combination with a pneumatic actuator of this type, the increased reliability of the door system reducing the likelihood of the pneumatic actuator having to be used, and thus allowing a high safety level overall.

The door system according to the invention also involves a particularly low level of maintenance, since the components comprised in the actuator housing can be replaced together in a simple, quick manner, and consequently saves costs. Owing to the compact construction, the door system can in addition be adapted particularly easily to different types of aircraft.

An aircraft or spacecraft is also proposed which comprises at least a door system of the type according to the invention, the door of the door system being, for example, a passenger door in an outer skin of the aircraft or spacecraft.

Advantageous configurations and improvements of the invention are found in the dependent claims.

The actuator drive preferably comprises an electric motor, since the door system can thus actuate the door particularly precisely and can be provided in a particularly economical, compact and low-weight manner. Alternatively, a hydraulic actuator drive can, for example, be provided.

According to a preferred development, the door system according to the invention comprises a door frame for receiving the door in a closed state and a door fixing arm which can be driven by the actuator drive and is pivotally fixed to the door frame about a first hinge and pivotally fixed to the door about a second hinge. Owing to the direct drive of the door fixing arm, which connects the door and the frame to each other, no parts of considerable size are required for the force transmission from the actuator to the door, which saves weight and costs.

According to a preferred development, the actuator is arranged at the first hinge and formed to apply a torque to the door fixing arm in relation to the door frame, about the first hinge. The arrangement at the door frame makes it possible to supply the actuator with electrical (optionally hydraulic) energy from outside the door, without supply lines between the door frame and the door being necessary. This means a lower level of complexity and higher operational reliability, since flexible supply lines are not required and the risk of damage to these supply lines is eliminated. Alternatively, the actuator can however also be arranged at the second hinge and formed to apply a torque to the door fixing arm in relation to the door, about the second hinge. This makes it possible, for example in the case of short line paths, to provide operational controls which are directly integrated in the door.

According to a preferred development, the actuator comprises a gear unit which is capable of reducing a rotational speed of the actuator drive by a predetermined ratio to achieve a pivot speed of the door fixing arm.

According to a preferred development, the actuator drive can be set in rotation by manual opening of the door. For example, the gear unit is configured so as to have a sufficiently low reduction ratio in such a way that human physical strength is sufficient to move the door while the actuator drive is also rotating. Manual actuation is thus also made possible, and the actuators, for example, electrical actuators, also does not cause any blockage of the shaft in the case of a manual actuation.

According to a preferred development, the actuator comprises an electromagnetic coupling which detachably couples the actuator drive to the door. This makes it possible to completely decouple the actuator drive from the door, in such a way that in an emergency, for example, the door can be opened manually without resistance and irrespective of a selected gear transmission ratio. The electromagnetic coupling is preferably arranged between the actuator drive and the gear unit.

According to a preferred development, the detection device comprises an angle sensor which detects an angle of the door system, for example an angle of a rotor of the actuator drive, an angle of a gear unit gear wheel, of the door, or of the door fixing arm. The angle sensor is preferably arranged between the gear unit and the door fixing arm in order to detect a pivot angle of the door fixing arm, for example in relation to the door frame or in relation to the door.

According to a preferred development, an operating device is also provided which is connected to the actuator control unit to operate the actuator. The operating device preferably comprises an output unit for outputting error messages of the door system.

According to a preferred development, a system test interface is also provided for the read-out of system test data by a test system of the aircraft or spacecraft. Interfaces of this type are, for example, referred to as BITE (Built-in test equipment) units. The BITE unit is, for example, capable of carrying out a fault diagnosis as a function of at least an angle signal and providing fault result data as a function thereof. The door system is thus advantageously capable of carrying out a fault diagnosis independently and providing the fault result data to the test system, that is to say to a higher-ranking entity, such as a central processing or control device.

BRIEF DESCRIPTION OF THE DRAWINGS

In the following, the invention will be described in greater detail on the basis of embodiments with reference to the accompanying figures.

In the figures.

In the figures, the same reference numerals denote like or functionally like components, unless stated otherwise.

DETAILED DESCRIPTION OF THE PREFERRED EMBODIMENTS

Figure 1:
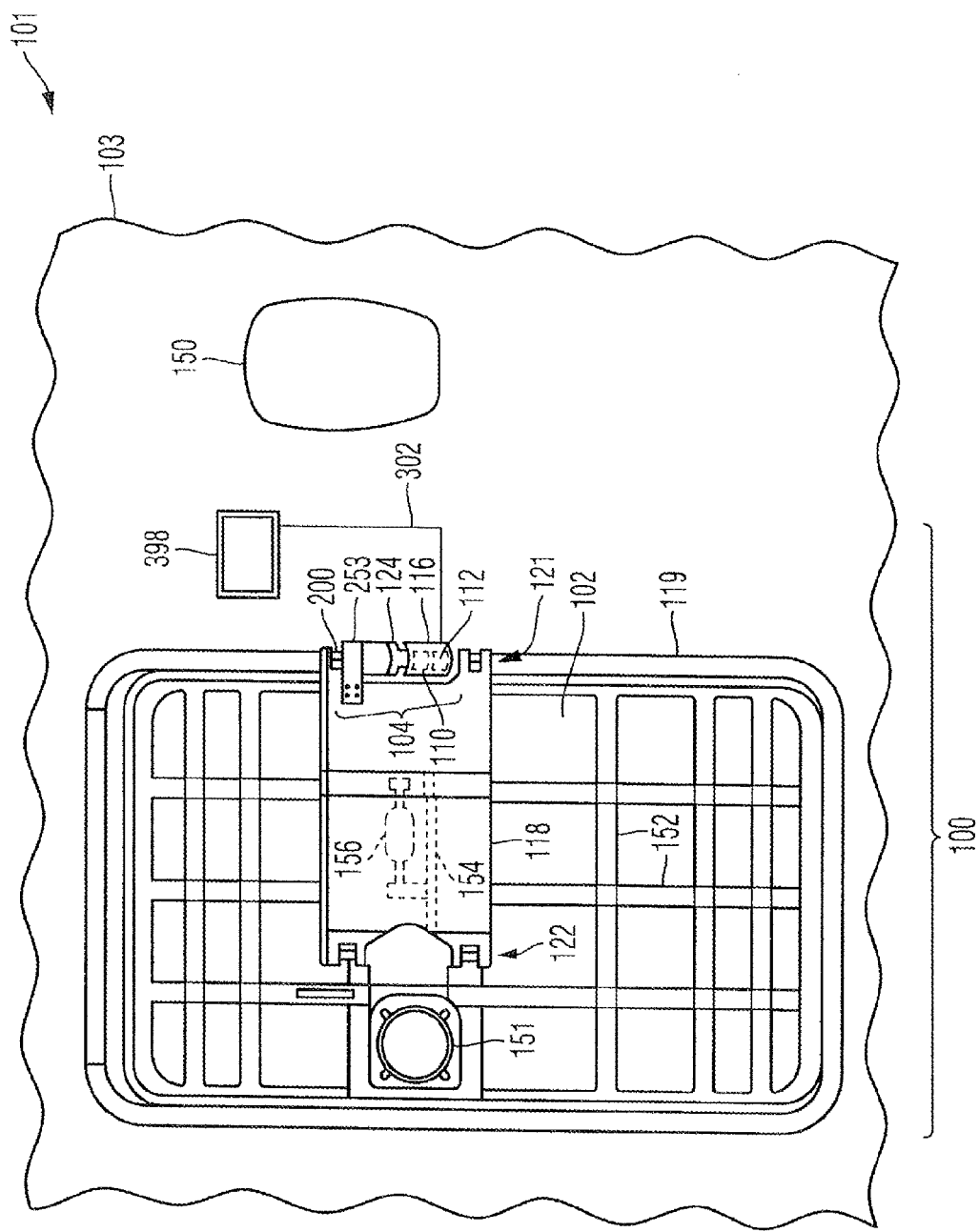
FIG. 1 is an internal view, open in part, of an embodiment of a door system according to the invention, having an electrical actuator, in an aircraft.

FIG. 1 shows an internal view of a portion of an outer wall 103 of a commercial aircraft 101, in which outer wall a door frame 119 is arranged in addition to an outer wall window 150. In the state shown, the door frame 119 is completely filled by a matching door 102, into which a window 151 is also integrated. In order to illustrate the internal structure and the functionality of the door 102, an inner lining, which typically covers the inside of a commercial aircraft door, has been omitted from the view. Also for clarity, a lever or grip for manual locking and unlocking, opening and closing of the door 102 is not shown.

Inside the door 102, visible, intersecting reinforcing elements 152 give the door 102 mechanical stability. The door 102 is connected to the door frame 119 via a door fixing arm 118 which is pivotally fixed to the door frame 119 about a first hinge 121, and pivotally fixed to the door 102 about a second hinge 122. In addition to the door fixing arm, the suspension of the door 102 comprises further mechanical components such as rods 154 inter alia, which, for clarity, are only indicated in this case. These cause the angles of the first 121 and second 122 hinge to be dependent on one another when the door 102 is opened, in such a way that when the door 102 is opened, it performs an outward pivoting movement having only one degree of freedom. On the side of the door fixing arm 118 remote from the viewer, a gas pressure cylinder 156 is installed, which serves as a pneumatic actuator for opening the door 102 in an emergency.

An electrical actuator 104 is mounted at the first hinge 121, which actuator is connected via an operating device feed line 302 to an operating device 398 attached near to the first hinge 121 in the inner lining of the outer wall 103. In alternative embodiments, the operating device 398, which, like the door 102, together with the door frame 119, door fixing arm 118 and actuator 104, belongs to the door system 100, is attached at other locations, for example on the opposite side of the door 102. In the present case, the operating device 398 is as a touchscreen inserted into the inner lining of the outer wall 103, which screen can be quickly and simply replaced in the event of damage.

Figure 2:
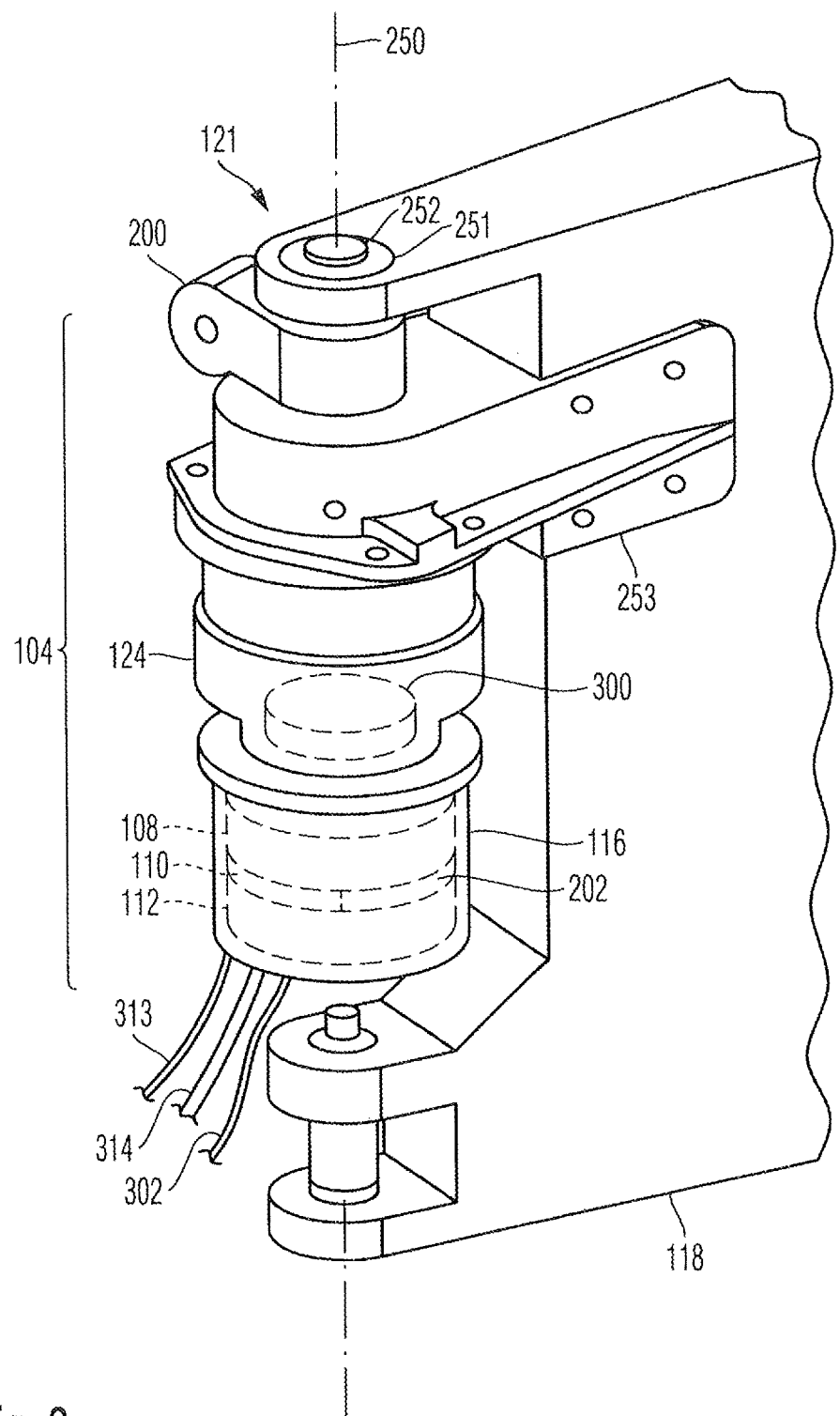
FIG. 2 is a perspective view of the electrical actuator from FIG. 1.

FIG. 2 shows the electrical actuator 104 in greater detail, viewed from the side facing the door 102, the door 102 itself being omitted in FIG. 2. The actuator 104 comprises a substantially cylindrical actuator housing 116, in which a, for example, brushless electric motor 108 as an actuator drive, and an associated actuator control unit 112 are contained. Also located in the actuator housing 116 are an angle sensor 202, for example a Hall sensor, and a detection device 110, which during operation determines, by means of the angle sensor 202, an angle of the electric motor 108, and transmits this angle to the actuator control unit 112.

A gear unit 124 for the gear reduction of the rotation of the electric motor 108 by a predetermined ratio is also located inside the actuator housing 116. The actuator housing 116 having the gear unit 124 is connected to the door fixing arm 118 in a non-rotational manner by means of a fixing fitting 253. A fixing lever 200 is flange-mounted in a non-rotational manner on an output shaft 252 of the gear unit 124 for the likewise non-rotational connection to the door frame 119. The distal end of the gear unit output shaft 252 is mounted on the door fixing arm 118 in an upper bearing 251 which, together with a lower bearing 254, is oriented along the pivot axis 250 of the first hinge 121 for the formation of said first hinge.

Figure 3:
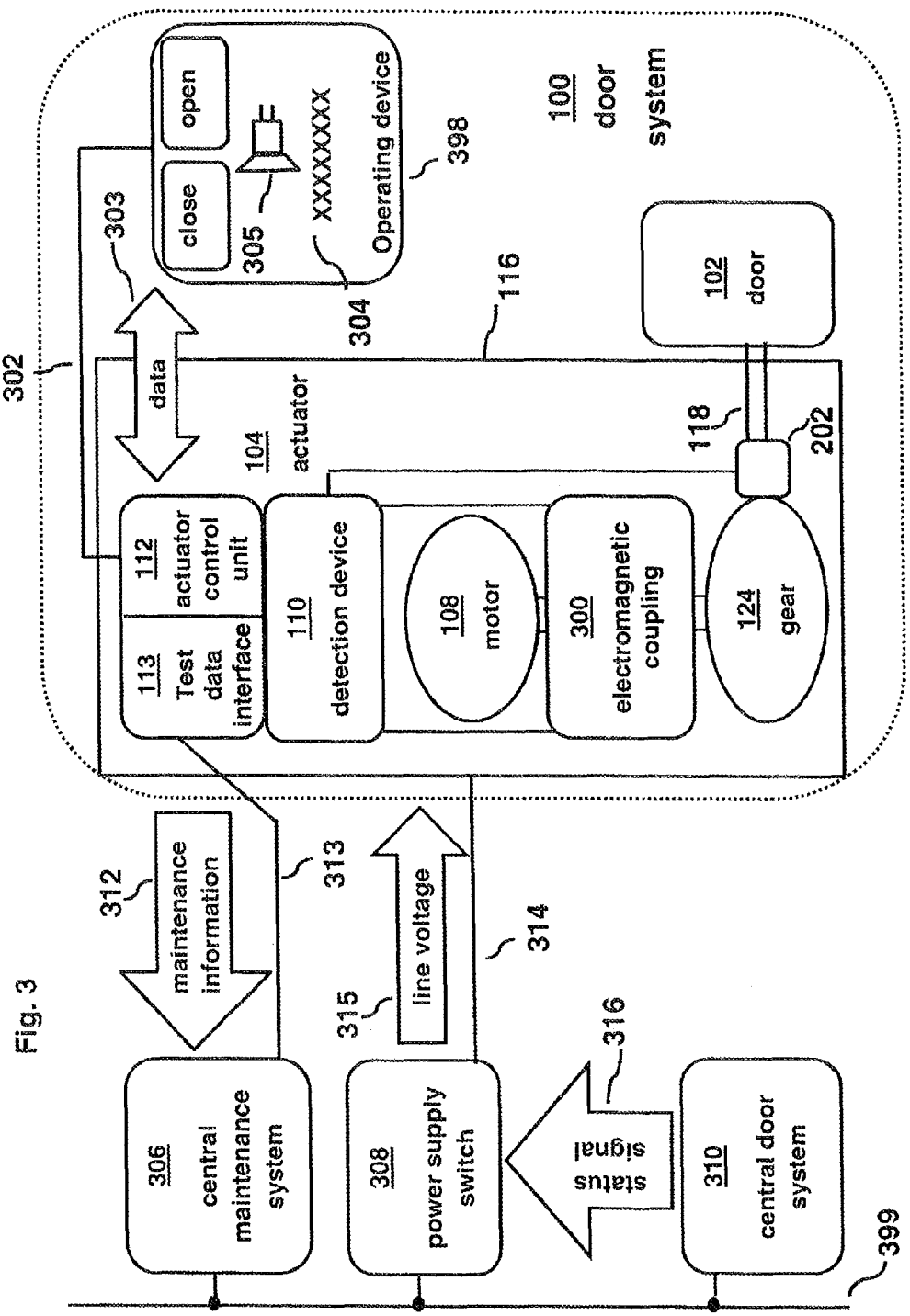
FIG. 3 is a schematic block diagram of an embodiment of a door system according to the invention, which is coupled to further on-board systems of an aircraft.

FIG. 3 is a schematic block diagram of an embodiment of a door system 100 according to the invention, which is coupled to further on-board systems 306, 308, 310 of an aircraft. The on-board systems 306, 308, 310 comprise a power supply switch 308 which is connected to the secondary energy supply network (not shown) of the aircraft and, when activated, connects a power supply feed line 314, which leads to the actuator 104, to this network, in such a way that the actuator 104 and the entire door system 100 is supplied with line voltage 315 of, for example, 115 VAC.

The on-board systems 306, 308, 310 also comprise a central door system 310 for the entire aircraft, which system provides a status signal 316 which indicates whether emergency slides provided at the doors have been deactivated. For example, for this purpose the central door system determines the state of activation of the emergency slides of all doors, or with less complexity, the state of activation of the emergency slide of only one individual door, preferably the door at the front left of the aircraft, which is typically opened at every landing for the disembarkation of passengers, in such a way that, in any case, the crew of the aircraft deactivate the emergency slide of this door before disembarkation. The power supply switch 308 is connected to the central door system 310, for example via a data bus 399, which for example operates according to the AFDX or ARINC 429 standard, and said switch is configured in such a way that it connects the line voltage 315 to the actuator 104 if the status signal 316 indicates that the emergency slides have been deactivated.

The on-board systems 306, 308, 310 also comprise a central maintenance system 306 of the aircraft, which is connected to a test data interface 113 of the actuator control unit 112 via a test data line 313 or a suitable data bus, in order to obtain maintenance information 312 such as error messages from the actuator control unit 112, which information can be centrally used and processed in this central maintenance system.

The operating device 398 comprises a touchscreen which, for example, displays two buttons, "OPEN" and "CLOSE", for opening and closing the door 102. The control device 398 also comprises a sound generator 305 for outputting warning signals such as a warning sound before the door 102 is opened by the actuator 104. The touchscreen of the operating device 398 is also formed to display diagnostic information about faults in a status display region 304, which faults occur in the door system 100, for example in the actuator 104 or in the operating device 398 itself. The operating device feed line 302 is designed to transmit data 303, comprising error messages, operating commands and feedback, in both directions between the operating device 398 and the actuator control unit 112. The operating device 398 is preferably also supplied with power by the actuator 104 via the operating device feed line 302.

During operation, the door 102 is closed and the energy supply switch 308 is opened owing to the status signal 316 which is output accordingly, in such a way that the door system 100 is dead and consumes no energy. In this state, the gear unit 124 of the actuator 104 is decoupled from the electric motor 108 by the electromagnetic coupling. After landing, when the aircraft crew deactivate the emergency slide, for example at the door at the front left of the aircraft, the status signal 316 changes in such a way that the energy supply switch 308 closes and the actuator 104 is supplied with energy 315 via the actuator supply line 314. The operating device 398 is also supplied with voltage via the operating device feed line 302. The actuator control unit 112 moves into a defined initial state (reset), starts, and executes a test program which tests whether the actuator control unit 112 and the operating device 398 are functioning without problems. The result is displayed in the status display region 304 of the operating device 398 and transmitted to the central maintenance system 306 of the aircraft.

After a member of the aircraft crew has manually unlocked the door 102, he/she presses the "OPEN" button on the touchscreen of the operating device 398. This sends a corresponding signal to the actuator control unit 112, whereupon the actuator control unit 112 controls the electromagnetic coupling 300 in such a way that it closes, and controls the electric motor 108 in such a way that it begins to rotate the door fixing arm 118 outwards in order to open the door 102. The actuator control unit 112 preferably causes the operating device 398 to emit a warning signal via the sound generator 305 before the door 102 begins to move, accompanied for example by a warning notice in the status display region 304.

During the rotation, the detection device 110 determines an angle signal of the angle sensor 202 and determines therefrom, as movement information of the door 102, a current pivot position of the door 102 between the completely closed and completely open position, and provides the current pivot position to the actuator control unit 112. If the current position corresponds to the completely open position, the actuator control device 112 stops the electric motor 108 and opens the electromagnetic coupling 300. The actuator control device 112 preferably regulates the rotational speed of the electric motor 102 while the door 102 pivots into the open position according to a speed profile which is, for example, predetermined and stored in a memory (not shown) of the actuator control unit 112 in the form of an allocation which allocates a desired speed value to every pivot position of the door 102. Furthermore, the actuator control unit can be formed to change the speed as a function of obstacles located in the pivot region, which obstacles are identified by monitoring the mechanical loading of the electric motor 108 or via specifically provided obstacle detectors, in order to prevent people from being injured.

If the operating personnel press the "CLOSE" button on the touchscreen of the operating unit, the actuator control unit 112 controls the sound generator 305, the electromagnetic coupling 300 and the electric motor 108 in an analogous manner, in such a way that the door 102 is closed at a pivot speed which is also controlled, and after reaching the closed position, the electromagnetic coupling 300 is opened.

Although the present invention has been described on the basis of preferred embodiments, it is not restricted thereto, but can be modified in many different ways. For example, it is conceivable to provide a self-sufficient power supply composed of, for example, ultracapacitors, in order to be able to use the actuator 104 to open the door 102, even in an emergency. In FIG. 3 the angle sensor 202 is shown arranged at the gear unit 124; it can also be formed, for example, as a Hall sensor at the rotor of the electric motor 108.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. A door system for an aircraft or spacecraft, the door system comprising:
   a door;
   an actuator for actuating the door;
   a door frame which receives the door in a closed state; and
   a door fixing arm, which is pivotably attached to the door frame about a first hinge and is pivotably attached to the door about a second hinge;
   wherein the actuator comprises:
   an actuator drive which moves the door in relation to the aircraft or spacecraft by driving an output shaft, which is rotatably mounted on the door fixing arm and a pivot axis of the output shaft is coaxial with a pivot axis of the first hinge or the second hinge;
   a detection device which determines movement information of at least one of the door and the actuator;
   an actuator control unit which controls the actuator based on the movement information; and
   a common actuator housing which surrounds the actuator drive and the actuator control unit, wherein the common actuator housing is connected to the door fixing arm in a non-rotational manner by a fastening bracket at an upper end of the common actuator housing, and wherein the output shaft is protruding from the upper end of the common actuator housing and is mounted on the door fixing arm in an upper bearing.

2. The door system according to claim 1, wherein the actuator drive comprises an electric motor.

3. The door system according to claim 1, wherein the actuator is arranged on the first hinge and applies a torque to the door fixing arm in relation to the door frame about the first hinge.

4. The door system according to claim 1, wherein the actuator is arranged at the second hinge and formed to apply a torque to the door fixing arm in relation to the door frame about the second hinge.

5. The door system according to claim 1, wherein the actuator comprises a gear, which reduces a rotational speed of the actuator drive by a predetermined ratio to achieve a pivot speed of the door fixing arm.

6. The door system according to claim 1, wherein the actuator drive is set in rotation by manual opening of the door.

7. The door system according to claim 1, wherein the actuator comprises an electromagnetic coupling for the detachable coupling of the actuator drive to the door.

8. The door system according to claim 1, wherein the actuator comprises a gear, which reduces a rotational speed of the actuator drive by a predetermined ratio to achieve a pivot speed of the door fixing arm, the actuator comprises an electromagnetic coupling for the detachable coupling of the actuator drive to the door, whereby the electromagnetic coupling is arranged between the actuator drive and the gear.

9. The door system according to claim 1, wherein the detection device comprises an angle sensor, which detects an angle of the door system.

10. The door system according to claim 9,
    wherein the actuator comprises a gear, which reduces a rotational speed of the actuator drive by a predetermined ratio to achieve a pivot speed of the door fixing arm; and
    wherein the angle sensor is arranged between the gear and the door fixing arm, in order to detect a pivot angle of the door fixing arm.

11. The door system according to claim 1, further comprising an operating device, which is connected to the actuator control unit to operate the actuator.

12. The door system according to claim 11, wherein the operating device comprises an output unit for outputting error messages of the door system.

13. The door system according to claim 1, further comprising a system test interface configured to provide a read-out of system data related to the movement information by a test system of the aircraft or spacecraft.

14. An aircraft or spacecraft having at least a door system according to claim 1.

* * * * *